US006826570B1

(12) United States Patent
Eshel et al.

(10) Patent No.: US 6,826,570 B1
(45) Date of Patent: Nov. 30, 2004

(54) DYNAMICALLY SWITCHING BETWEEN DIFFERENT TYPES OF CONCURRENCY CONTROL TECHNIQUES TO PROVIDE AN ADAPTIVE ACCESS STRATEGY FOR A PARALLEL FILE SYSTEM

(75) Inventors: Marc M. Eshel, San Jose, CA (US); Carol D. Hartman, San Jose, CA (US); Frank B. Schmuck, Campbell, CA (US); James C. Wyllie, Monte Screno, CA (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 09/618,371

(22) Filed: Jul. 18, 2000

(51) Int. Cl.[7] ............................................. G06F 17/30
(52) U.S. Cl. ............................. 707/8; 707/10; 707/200; 711/152
(58) Field of Search ............................. 707/8, 100, 101, 707/103 R, 200, 202, 205, 1, 10; 711/1, 137, 152

(56) References Cited

U.S. PATENT DOCUMENTS

| | | | | |
|---|---|---|---|---|
| 5,077,658 A | | 12/1991 | Bendert et al. ............. 395/600 |
| 5,129,088 A | | 7/1992 | Auslander et al. .......... 395/700 |
| 5,161,227 A | * | 11/1992 | Dias et al. ................... 718/104 |
| 5,175,852 A | * | 12/1992 | Johnson et al. ............... 707/8 |
| 5,202,971 A | * | 4/1993 | Henson et al. ................ 707/8 |
| 5,247,664 A | * | 9/1993 | Thompson et al. ........... 707/10 |
| 5,247,672 A | * | 9/1993 | Mohan ........................ 711/152 |
| 5,404,511 A | | 4/1995 | Notarianni ................... 395/600 |
| 5,454,108 A | | 9/1995 | Devarakonda et al. ...... 395/650 |
| 5,551,023 A | * | 8/1996 | Alonso .......................... 707/8 |
| 5,805,809 A | * | 9/1998 | Singh et al. ................. 709/203 |
| 5,819,276 A | | 10/1998 | Cai et al. ..................... 707/100 |
| 5,940,841 A | * | 8/1999 | Schmuck et al. ........... 707/205 |
| 5,948,062 A | * | 9/1999 | Tzelnic et al. .............. 709/219 |
| 5,950,199 A | | 9/1999 | Schmuck et al. .............. 707/8 |
| 5,953,720 A | | 9/1999 | Mithal et al. .................. 707/10 |
| 5,956,745 A | | 9/1999 | Bradford et al. ............ 711/137 |
| 6,275,823 B1 | * | 8/2001 | Ronstrom ....................... 707/8 |
| 6,324,581 B1 | * | 11/2001 | Xu et al. ....................... 707/10 |
| 6,360,219 B1 | * | 3/2002 | Bretl et al. .................... 707/8 |
| 6,442,564 B1 | * | 8/2002 | Frey et al. .............. 707/103 R |

OTHER PUBLICATIONS

Tai, Ann T. et al., "Performability Management in Distributed Database Systems: An Adaptive Concurrency Control Protocol", Proceedings, 4th Int. Conf. on Modeling, Analysis and Simulation of Computer and Telecommunication Systems, 2/96, pp. 212–216.*

Ben–Shaul, Israel et al., "An Architecture for Multi–User Software Development Environments," 1992 ACM, pp. 149–158.*

(List continued on next page.)

*Primary Examiner*—Shahid Alam
(74) *Attorney, Agent, or Firm*—Lawrence D. Cutter, Esq.; Blanche E. Schiller, Esq.; Heslin Rothenberg Farley & Mesiti P.C.

(57) ABSTRACT

Concurrent access to data is managed through concurrency control techniques. Various types of techniques are employed to manage the access, including locking-based techniques and non-locking-based techniques. A dynamic switch from one type of concurrency control technique (e.g., a locking-based technique) to a different type of concurrency control technique (e.g., a non-locking-based technique) is enabled. This switching is based on access patterns and/or application requirements for each file. The switching allows enhanced performance for both coarse-grain sharing and fine-grain sharing of data.

41 Claims, 3 Drawing Sheets

OTHER PUBLICATIONS

Fu, Shiwa et al., "Lock Improvement Technique for Release Consistency in Distributed Shared Memory Systems," Proceedings 'Frontiers '96', Sixth Symposium on the Frontiers of Massivly Parallel Computing, Oct. 1996, IEEE pp. 255–262.*

Halici, Ugur et al., "An Optimistic Locking Technique For Concurrency Control in Distributed Databases," IEEE Transactions on Software Engineering, vol. 17, No. 7, Jul. 1991, pp. 712–724.*

Munson, Jonathan et al., "A Concurrency Control Frameeork for Collaborative Systems," 1996 ACM, pp. 278–287.*

Rosenkrantz, Daniel et al., "System Level Concurrency Control for Distributed Database Systems," ACM Transaction on Database Systems, vol. 3, No. 2, Jun. 1978, pp. 178–198.*

Yu, Philip et al., "Performance Analysis of Concurrency Control Using Locking with Deferred Blocking," IEEE Transactions On Software Engineering, vol. 19, No. 10, Oct. 1993, pp. 982–996.*

"Adaptive Lock Escalation/De–escalation" TDB–ACC–No. NN9201172, IBM Technical Disclosure Bulletin, Jan. 1992, US, vol. 34, Issue 8, pp. 172–174.*

Application No. 3450499—Analysis of Trade–Offs in Distributed Locking for Transaction Processing System (Abstract Only).

* cited by examiner

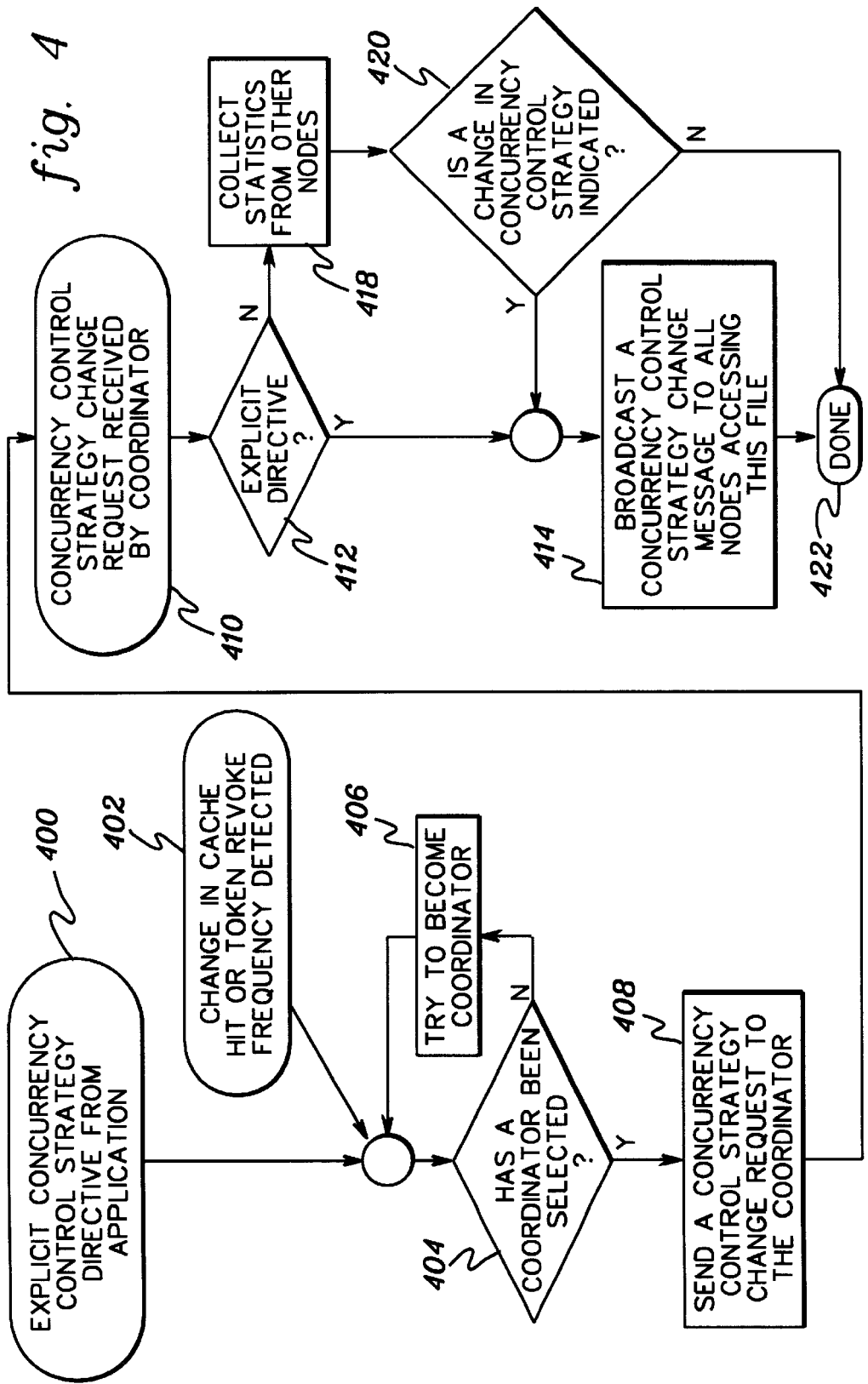

DYNAMICALLY SWITCHING BETWEEN DIFFERENT TYPES OF CONCURRENCY CONTROL TECHNIQUES TO PROVIDE AN ADAPTIVE ACCESS STRATEGY FOR A PARALLEL FILE SYSTEM

TECHNICAL FIELD

This invention relates, in general, to parallel data processing, and in particular, to providing an adaptive access strategy for a parallel file system of a computing environment.

BACKGROUND ART

A parallel, shared disk file environment includes a set of computer nodes, disk storage devices, a communication network, and a parallel file system running on each computer node. A parallel file system differs from a traditional distributed file system, like the Network File System (NFS) or the Distributed File System (DFS), in that with a parallel file system, data belonging to the same file is distributed or "striped" across disks that are attached to different nodes in the environment or directly attached to the network. A parallel file system allows data to be transferred between disks and computer nodes without requiring all the data to pass through a single server node. While this eliminates the single server bottleneck inherent in traditional distributed file systems, it requires coordinating access to the shared disks from different nodes to guarantee correct file system behavior.

In order to achieve this coordination, two different concurrency control techniques are available:

1. A distributed locking technique: With a distributed locking technique, before a node is allowed to read or write a particular data block of a file, it first acquires permission to do so from a distributed lock service (e.g., a distributed lock manager). This is done by sending a message to obtain a read-token or a write-token from a centralized token server node. Once an appropriate token (read or write) has been obtained, the node is allowed to read data from the disk and keep the data in its buffer cache, so that future requests for data in the same range can be satisfied locally without additional messages or disk I/O. If a write-token is obtained, the node is also allowed to modify the data in its buffer cache and to write the modified data back to disk. Each token represents a right to read and/or update one or more data blocks of a file, identified by a logical offset and length within the file (i.e., a byte-range token).

The token server keeps track of what tokens were granted to each node and ensures that no two nodes are holding conflicting tokens for the same data blocks. That is, only one node at a time is allowed to hold a token in write mode, whereas multiple nodes can hold a token in read mode. Before the token server grants a token to a node, conflicting tokens held by other nodes are revoked. For example, the granting of a write-token includes revoking all tokens for the same range held by other nodes, whereas the granting of a read-token only requires revoking a write-token that might be held by another node (or at least downgrading the token from write mode to read mode). Revoking a read-token from a node includes discarding the corresponding data from the buffer cache. Downgrading and/or revoking a write-token from a node includes flushing modified data to disk and/or discarding that data from the buffer cache.

One example of a distributed locking technique is employed by the General Parallel File System (GPFS), offered by International Business Machines Corporation. Further, one example of a distributed locking technique is described in U.S. Pat. No. 5,950,199, entitled "Parallel File System and Method For Granting Byte Range Tokens," Schmuck et al., Issued Sep. 7, 1999, which is hereby incorporated herein by reference in its entirety.

2. A static file partitioning technique: With static file partitioning, all data blocks of a file are statically partitioned among a fixed set of nodes. For example, blocks might be assigned in a round-robin fashion. That is, to partition a file among a set of n nodes numbered 0, 1, . . . , n−1, block i of a file is assigned to node number (i mod n). Reading or writing a data block of a file includes sending a message to the node that the particular data block was assigned. Each node caches in its buffer pool only those data blocks that were assigned to that node.

One example of a static file partitioning technique is employed by the Parallel I/O File System (PIOFS), offered by International Business Machines Corporation. Further, one example of a static file partitioning technique is described in Corbett, Peter F.; Feitelson, Dror G., "Design and Implementation of the Vesta Parallel File System," IBM T. J. Watson Research Center, Yorktown Heights, N.Y. 10598, IEEE Computer Society Press, pp. 63–70, published May 1994, which is hereby incorporated herein by reference in its entirety.

The distributed locking technique advantageously allows the caching of data on the node on which it is being used. For applications that exhibit coarse-grain sharing, i.e., applications where different nodes are accessing relatively large, contiguous, non-overlapping ranges of a file, the distributed locking technique may perform better than the static file partitioning technique. This is because the distributed locking technique allows the satisfying of most read and write requests from data cached in the local buffer pool, whereas static file partitioning sends a message to another node for almost all read and write requests.

On the other hand, for applications that exhibit fine-grain sharing, i.e., applications where read or write requests from different nodes frequently require access to the same data block of the file, the distributed locking technique may perform worse than the static file partitioning technique. This is because under distributed locking, reads and writes to the same data block from different nodes include revoking tokens, causing extra message traffic and disk I/O. Also, if the application accesses many different, disconnected ranges of a file (e.g., random rather than sequential access), each node will acquire many different byte range tokens; this may lead to an unmanageably large token state that the lock server would need to maintain.

Thus, while each of the concurrency control techniques offers some advantages, neither of the techniques is appropriate in all situations. Therefore, a concurrency control strategy is still needed that at least minimizes the disadvantages of the various techniques. Specifically, a need exists for a strategy that enables the dynamic switching between different types of concurrency control techniques depending on the particular need at the time.

SUMMARY OF THE INVENTION

The shortcomings of the prior art are overcome and additional advantages are provided through the provision of a method of managing access to data of a computing environment. The method includes, for instance, dynamically switching from one type of concurrency control technique to a different type of currency control technique used to access data of the computing environment; and using the different concurrency control technique to access the data.

System and computer program products corresponding to the above-summarized methods are also described and claimed herein.

The concurrency control strategy of an aspect of the present invention advantageously enables the dynamic switching within a single file system from one type of concurrency control technique (e.g., a locking-based technique) to a different type of concurrency control technique (e.g., a non-locking-based technique). This improves system performance by allowing the appropriate technique to be used with the applications most suited for that technique. For example, for applications requiring coarse-grain data sharing, a locking-based technique may be selected; while for applications requiring fine-grain data sharing, a non-locking-based technique may be selected.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 depicts one embodiment of the logic used to dynamically change from one type of concurrency control technique to a different type of concurrency control technique, in accordance with an aspect of the present invention.

BEST MODE FOR CARRYING OUT THE INVENTION

In accordance with an aspect of the present invention, a file system, employed to control access to one or more files, can dynamically switch between a plurality of concurrency control techniques that are used to provide the control. This enables efficient access to the data, and does so without compromising the consistency of the file system data.

Figure 1:
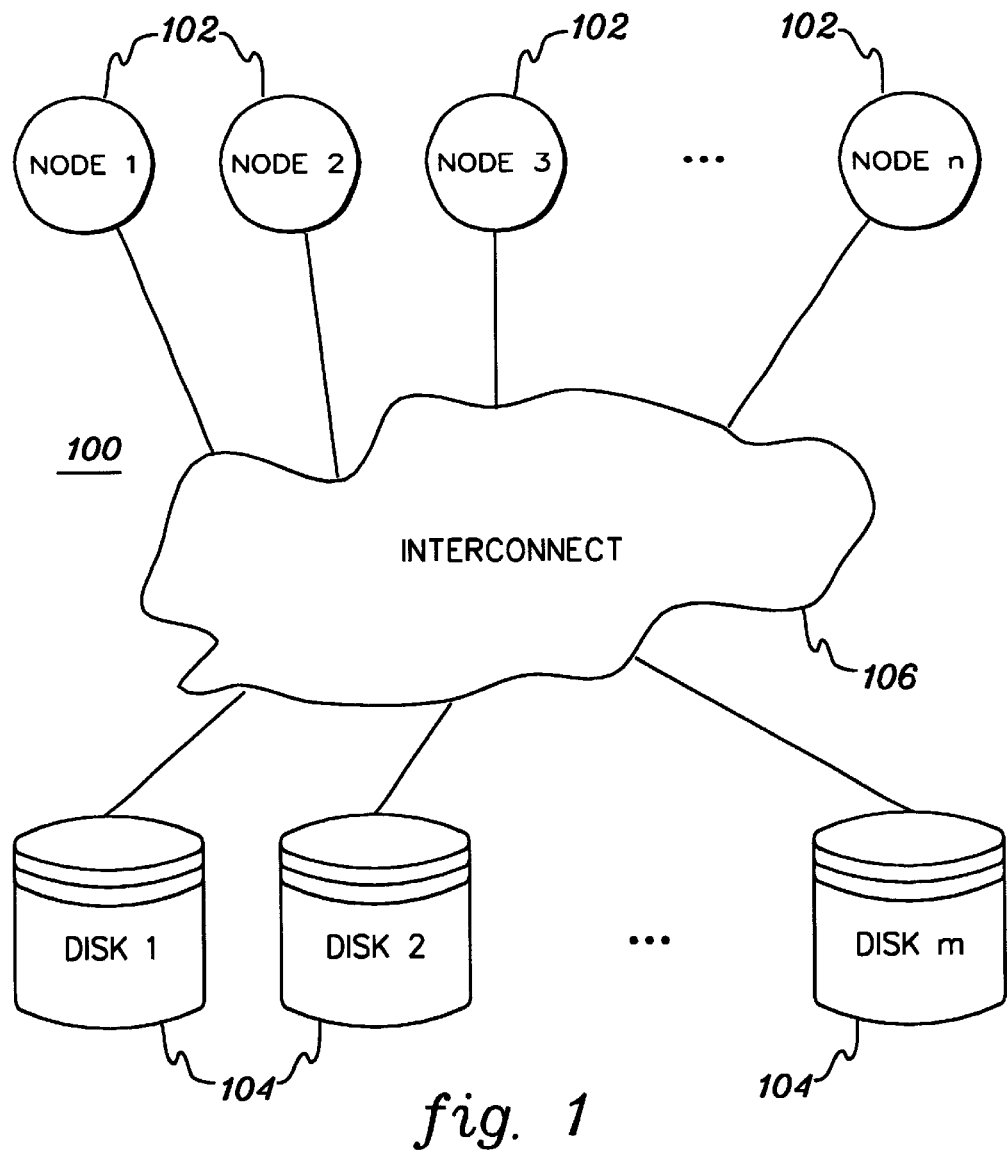
FIG. 1 depicts one example of a computing environment incorporating and using one or more aspects of the present invention.

One embodiment of a computing environment incorporating and/or using aspects of the present invention is described with reference to FIG. 1. Computing environment 100 includes one or more nodes 102 (e.g., Node 1, . . . Node n), which share access to one or more storage devices 104 (e.g., Disk 1, . . . Disk m). The nodes are coupled to each other and to the storage devices via an interconnect 106. In one example, the interconnect includes a wire connection, token ring or network connection, to name just a few examples. One communications protocol used by one or more of these connections is TCP/IP.

Figure 2:
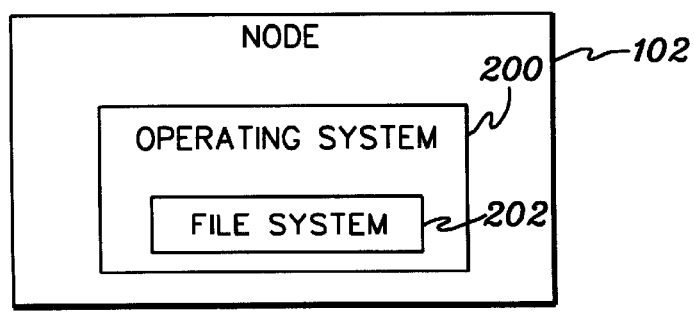
FIG. 2 depicts further details of a node of FIG. 1, in accordance with an aspect of the present invention.

As one example, a node 102 includes an operating system 200 (FIG. 2), such as the AIX Operating System, offered by International Business Machines Corporation. The operating system includes a file system 202 (e.g., a software layer), such as the General Parallel File System (GPFS), offered by International Business machines Corporation, which is used to manage concurrent accesses to data.

In particular, file system 202 is employed to control the concurrent accesses to data within one or more files located in the various storage devices. The file system uses, in accordance with an aspect of the present invention, a plurality of concurrency control techniques to control access to the file system data. However, in one embodiment, in order to maintain the consistency of the file system data, at any particular time, the nodes access a particular file using the same concurrency control technique. That is, one file is not accessed by different techniques at the same time. This is because if some nodes were to access the file using one technique and some other nodes used another technique, then two different nodes would be able to modify the same data block in their local buffer cache. Then, when the data block is later flushed to disk, the updates from one of the two nodes would be lost. Thus, in this embodiment, at any particular time, a file is accessed by one concurrency control technique. However, different files may be accessed by different techniques. That is, one file system may access a file using one technique and a different file using a different technique. The file system maintains state that indicates which technique is currently being used to access which files.

File system 202 can dynamically switch between a plurality of different types of concurrency control techniques for each file. For example, the file system can switch between a locking-based concurrency control technique (e.g., distributed locking) and a non-locking-based concurrency control technique (e.g., static file partitioning). The switching is dynamic in that it can occur at any time (i.e., prior to any read/write access). Thus, the file system is not statically set to access the file using a single type of concurrency control technique. Instead, it can switch back and forth between two or more types of techniques.

The concurrency control techniques are used to coordinate between different nodes accessing the same file, in order to ensure proper execution of file system operations, such as read and/or write requests. One embodiment of the logic associated with handling read/write requests, in accordance with an aspect of the present invention, is described with reference to FIG. 3. The logic of FIG. 3 is implemented, in one example, by a file system.

Figure 3:
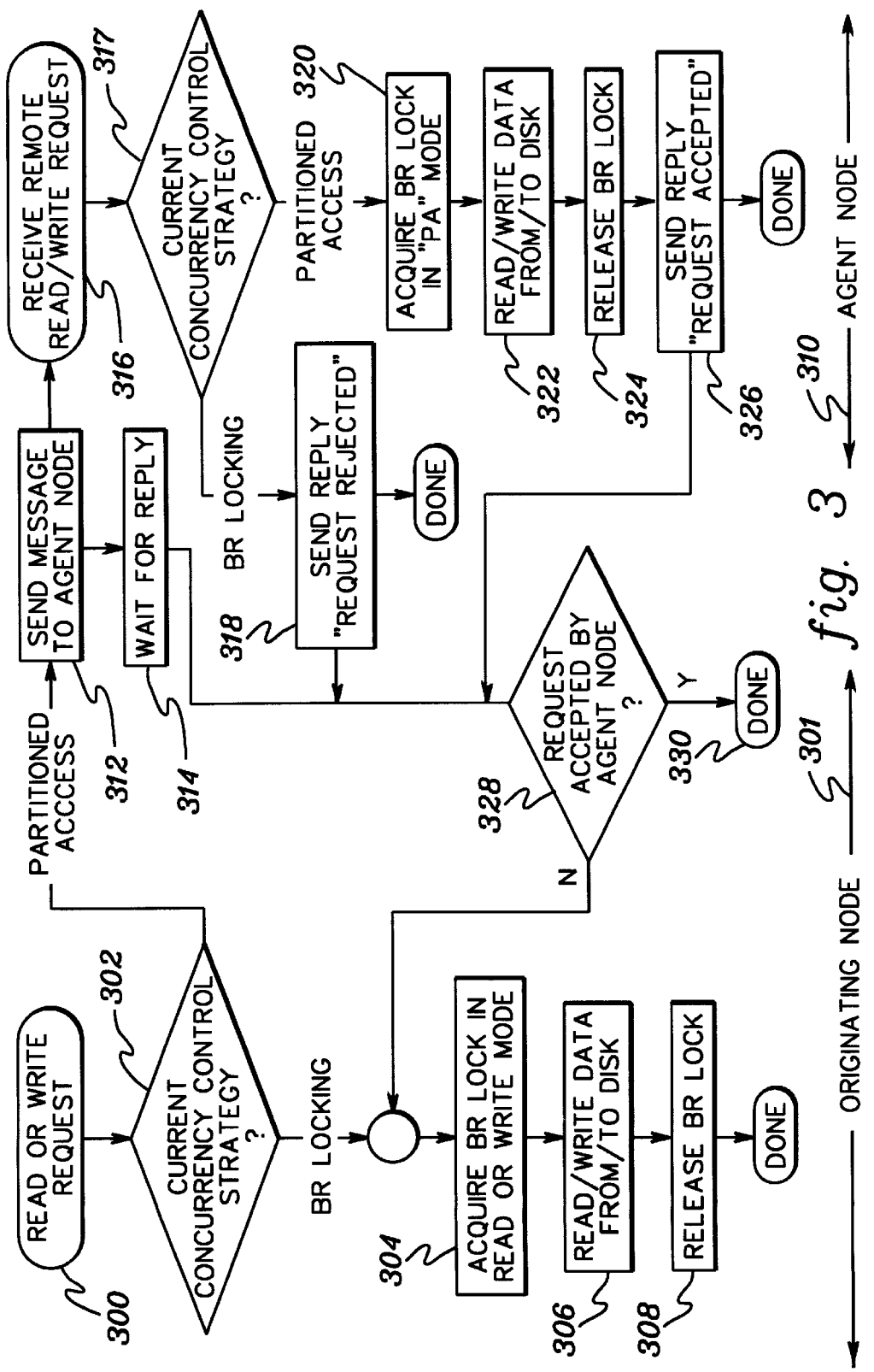
FIG. 3 depicts one embodiment of the logic used to handle read and write requests, in accordance with an aspect of the present invention.

Referring to FIG. 3, when a read or write request 300 is initiated by an originating node 301, a determination is made as to the current concurrency control technique for the file to be accessed, INQUIRY 302. This determination is made by, for instance, checking an indicator saved in the state associated with the file system. If the current concurrency control strategy for the file is the distributed locking technique (i.e., byte range (BR) locking), then a byte range lock is acquired in read or write mode, STEP 304. One example of acquiring such a lock is described in detail in U.S. Pat. No. 5,950,199, entitled "Parallel File System and Method For Granting Byte Range Tokens," Schmuck et al., Issued Sep. 7, 1999, which is hereby incorporated herein by reference in its entirety. Thereafter, the data is read from or written to the disk, STEP 306, and the byte range lock is released, STEP 308.

Returning to INQUIRY 302, if however, the current concurrency control technique for the file is the static file partitioning technique, then a message including the read or write request is sent from originating node 301 to an agent node 310, STEP 312. The agent node is responsible for processing the read or write requests for each data block assigned to that node. That is, the agent node processes read/write requests on behalf of other nodes.

Subsequent to sending the message to the agent node, originating node 301 waits for a reply, STEP 314. Meanwhile, agent node 310 receives the remote read/write request, STEP 316, and continues processing.

In particular, the file system on the agent node determines the current concurrency control technique being used for access of that file, INQUIRY 317. If the current concurrency control technique is the distributed locking technique, then a reply is sent back to the originating node indicating that the request is rejected, STEP 318. However, if the current concurrency control technique is the static file partitioning technique, then a byte range lock is acquired in partitioned access-mode (PA mode), STEP 320. Partitioned access-mode is a lock mode for byte-range tokens, which when acquired, indicates that the distributed locking technique is not being used for subsequent read/write requests (unless switched back to that mode). A PA-token conflicts with both read tokens and write tokens, but is compatible with other PA-tokens, as indicated by the following conflict table:

|       | read | write | PA |
|-------|------|-------|----|
| read  | —    | X     | X  |
| write | X    | X     | X  |
| PA    | X    | X     | —  |

As shown above, there may be one or more PA-tokens that are obtained. (Similarly, one or more read-tokens are obtainable, but only one write-token at a time.)

Agent node 310 acquires a PA-mode lock for a range from zero to infinity (i.e., a range covering the whole file). Since this lock conflicts with read and write locks for the same file, no other node can access the file using normal distributed locking, when the agent is processing the request. Furthermore, since granting the PA-token includes revoking the read/write tokens from other nodes, data read or written using normal distributed locking will be flushed to disk and discarded from the buffer cache on other nodes. This ensures that when a file is being accessed using static file partitioning, only the agent node that a particular data block is assigned to will be able to cache that block, thus avoiding the consistency problem described above.

The use of PA-tokens provides the consistency of the file system data even when there is a disagreement among different nodes about which locking strategy is currently in use. If some nodes continue to execute read/write operations locally, while others use partitioned access and forward their requests to an agent node, performance may suffer because of PA-tokens being revoked from agent nodes, but consistency is maintained.

The distributed lock manager is used to ensure that a file can be accessed one way or the other, but not both at the same time. Even though the distributed lock manager is still active when the file is being accessed using static file partitioning, this causes no extra overhead compared to pure static file partitioning, because no interaction with the token server is required, once each agent has obtained the PA-token.

After acquiring the byte range lock in PA-mode, the data is either read from or written to the disk, STEP 322. Thereafter, the byte range lock is released, STEP 324, and a reply is sent from agent node 310 to originating node 301 indicating that the request has been accepted, STEP 326.

Originating node 301 receives the reply and makes a determination as to whether the request was accepted by the agent node, INQUIRY 328. If the request was accepted, then processing is complete, STEP 330. However, if the request was not accepted by the agent node, then processing continues with STEP 304, as described above.

In one example, initially, the files are accessed under the distributed locking technique using read-tokens or write-tokens to synchronize access to the data on the disks. At some point, it may be decided that a switch to another concurrency control strategy (e.g., the static file partitioning strategy) for one or more files is to be made, such that the read and write requests for each data block are forwarded to the node that the data block has been assigned. The decision to initiate a switch is based, in accordance with an aspect of the present invention, on one or more selection policies. One such policy includes an explicit selection policy, while another such policy includes an automatic selection policy.

The explicit selection policy relies on the application programmer to decide which concurrency control strategy is best suited for a given application. A system call is available for use by the program to instruct the file system as to which concurrency control technique is to be used for a particular file, and in the case of static partitioning, how to partition the file among the available nodes.

Under the automatic selection policy, all files start out using a default concurrency control strategy, e.g., the distributed locking technique. Each node independently maintains per-file statistics about cache hit and token revoke frequency. If the ratio of cache hits to token revokes drops below a predetermined threshold (e.g., 1), this is an indication that the file may be accessed more efficiently using a different type of concurrency control technique, such as static file partitioning.

Regardless of the selection policy used, after the decision is made to initiate a switch from one type of technique to another type, steps are taken to determine if the switch is to be made and if so, to effect the switch. One example of the logic used to dynamically change the concurrency control technique used by a file system to access a file is described with reference to FIG. 4.

Initially, either an explicit concurrency control strategy directive 400 is received from an application for a particular file, or a change in the cache hit or token revoke frequency for a file is detected 402. When either of these events occurs, a determination is made as to whether a change coordinator has been selected, INQUIRY 404. The coordinator can either be a single, pre-selected node, or a node that is selected dynamically when needed. To select the coordinator node, a lock server (or token manager, such as the distributed lock manager) can proceed, for instance, as follows: The first time the desire to switch the concurrency control strategy for a file arises, the node wishing to do so requests an exclusive coordinator token from the lock server (i.e., the distributed lock manager). Should another node attempt to become coordinator at the same time, whichever node is able to acquire the coordinator token first will act as the coordinator. This technique allows selecting different coordinator nodes for different files by associating a different coordinator token with each file.

Thus, in one example, the determination of whether a coordinator has been selected is made by requesting an exclusive coordinator token from the token manager. If the token is granted, then a coordinator has not been previously selected. Thus, the node that is initiating the change becomes the coordinator node, STEP 406. If, however, the token is not granted, then a coordinator has already been selected.

After selecting the coordinator, a concurrency control strategy change request is sent by the file system to the coordinator, STEP 408. This request indicates the requested change, and whether the change request is the result of an explicit directive.

The concurrency control strategy change request is then received by the coordinator, STEP 410. After receiving the request, the coordinator determines whether it is an explicit directive, INQUIRY 412. If it is an explicit directive, then the coordinator broadcasts a concurrency control strategy change message to the nodes accessing the file, STEP 414. This message indicates to the file systems on those nodes the concurrency control technique to be used for subsequent read/write requests of the file.

In one example, the message is sent to the nodes using a communications protocol, such as TCP/IP. Assuming a reliable communications protocol and assuming that the coordinator node does not fail, the nodes will receive the message and switch to the new concurrency control strategy within a short period of time. Should the coordinator fail, the nodes simply switch back to the default strategy, e.g., distributed locking.

Returning to INQUIRY 412, if the requested change is not an explicit directive, then the coordinator node collects statistics from the other nodes, STEP 418. For example, the coordinator collects cache hit and token revoke frequency statistics for the file at issue from the various nodes that have access to the file, and computes global cache hit and token revoke statistics. These statistics are used in determining whether a switch is to be made. For example, if the ratio of cache hits to token revokes falls below a predetermined threshold, then a change is indicated.

If a change is not indicated, INQUIRY 420, then processing is complete, STEP 422. However, if a change in the concurrency control strategy is indicated, INQUIRY 420, and this change is to static file partitioning, then the coordinator determines an appropriate partitioning. Further, if a change is indicated, the coordinator broadcasts a concurrency control strategy change message, which includes the change and the chosen partitioning, assuming file partitioning is selected.

While static partitioning is in use, each agent node maintains statistics about cache hits, as well as avoided token revokes (i.e., token revokes that would have been necessary had the concurrency control strategy not been switched). The latter is done by recording the origin and type of the last read/write request for each data block that is currently cached. Each time an agent receives a request that comes from a different node than the last request for the same block and that conflicts with the previous request (the previous or the current request was a write request), it is counted as an avoided token revoke. The coordinator collects and aggregates these statistics, and if the global ratio of cache hits to avoided token revokes exceeds a predetermined threshold (e.g., 1), it switches the concurrency control strategy back to, for instance, distributed locking. This is accomplished using the logic, as described with reference to FIG. 4.

When switching the concurrency control strategy from a file partitioning technique back to distributed locking, the first request for a read or write-token causes the PA-tokens to be revoked. At that time, the agent nodes flush the data blocks modified using file partitioning back to disk and discard those blocks from their cache.

Described in detail above is a facility for dynamically switching between a plurality of different types of concurrency control techniques used to control the access of data.

The dynamic switching of concurrency control techniques provides performance enhancements by allowing, for instance, a non-locking-based concurrency control technique to be used for applications that exhibit fine-grain data sharing, while allowing, for instance, a locking-based concurrency control technique for those applications desiring coarse-grain data sharing. The concurrency control technique for an individual file is selected based on access patterns and/or application requirements.

Although the embodiments herein have been described in terms of a locking-based concurrency control technique and a non-locking-based concurrency control technique, the invention is also applicable to other types of concurrency control techniques. Further, the invention is applicable to switching between different types of locking-based concurrency control techniques, as well as different types of non-locking-based concurrency control techniques, or any combination thereof. Thus, these are all considered within the scope of the present invention.

The above-described computing environment is offered as only one example. One or more aspects of the present invention can be incorporated and used with many types of computing units, computers, processors, nodes, systems, work stations and/or environments without departing from the spirit of the present invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing access to data of a computing environment, said method comprising:

dynamically switching for a fine grain sharing application from a locking based concurrency control technique to a non-locking based concurrency control technique used to access data of said computing environment, wherein said data is maintained on shared media accessible by a plurality of nodes of said computing environment; and using said non-locking based concurrency control technique to access said data.

2. The method of claim 1, wherein said fine grain sharing application includes requests from different nodes that frequently require conflicting access to a same data block.

3. The method of claim 1, wherein the locking based concurrency control technique comprises a distributed locking technique using read tokens/write tokens to synchronize access to said data.

4. The method of claim 1, wherein the non-locking based concurrency control technique comprises a static file partitioning technique.

5. The method of claim 1, further comprising determining that a change to a different type of concurrency control technique is to occur.

6. The method of claim 5, wherein said determining comprises receiving an indication that said different type of concurrency control technique is to be used.

7. The method of claim 5, wherein said determining comprises employing statistics to determine if a change is to be made.

8. The method of claim 7, wherein said employing statistics comprises comparing a ratio of cache hits to token revokes to a predetermined threshold to determine if the change is to be made.

9. The method of claim 1, further comprising switching back to said locking based concurrency control technique.

10. The method of claim 1, wherein said using comprises acquiring a lock for said data that indicates said locking based concurrency control technique is not being used.

11. The method of claim 1, further comprising:
   initiating a request to change to said non-locking based concurrency control technique, said initiating comprising providing a change request to a coordinator;
   determining, by said coordinator, whether the change is to occur; and
   sending a change message from said coordinator to one or more nodes of said computing environment to effect said dynamically switching, when said change is to occur.

12. The method of claim 11, wherein said determining comprises at least one of:
   receiving an explicit indication of said change; and
   using statistics to determine if the change is to be made.

13. A system of managing access to data of a computing environment, said system comprising:
   means for dynamically switching for a fine grain sharing application from a locking based concurrency control technique to a non-locking based concurrency control technique used to access data of said computing environment, wherein said data is maintained on shared media accessible by a plurality of nodes of said computing environment; and
   means for using said non-locking based concurrency control technique to access said data.

14. The system of claim 13, wherein said fine grain sharing application includes requests from different nodes that frequently require conflicting access to a same data block.

15. The system of claim 13, wherein the locking based concurrency control technique comprises a distributed locking technique using read tokens/write tokens to synchronize access to said data.

16. The system of claim 13, wherein the concurrency control technique comprises a static file partitioning technique.

17. The system of claim 13, further comprising means for determining that a change to a different type of concurrency control technique is to occur.

18. The system of claim 17, wherein said means for determining comprises means for receiving an indication that said different type of concurrency control technique is to be used.

19. The system of claim 17, wherein said means for determining comprises means for employing statistics to determine if a change is to be made.

20. The system of claim 19, wherein said means for employing statistics comprises means for comparing a ratio of cache hits to token revokes to a predetermined threshold to determine if the change is to be made.

21. The system of claim 13, further comprising means for switching back to said locking based concurrency control technique.

22. The system of claim 13, wherein said means for using comprises means for acquiring a lock for said data that indicates said locking based concurrency control technique is not being used.

23. The system of claim 13, further comprising:
   means for initiating a request to change to said non-locking based concurrency control technique, said means for initiating comprising means for providing a change request to a coordinator;
   means for determining, by said coordinator, whether the change is to occur; and
   means for sending a change message from said coordinator to one or more nodes of said computing environment to effect said dynamically switching, when said change is to occur.

24. The system of claim 23, wherein said means for determining comprises at least one of:
   means for receiving an explicit indication of said change; and
   means for using statistics to determine if the change is to be made.

25. At least one program storage device readable by a machine, tangibly embodying at least one program of instructions executable by the machine to perform a method of managing access to data of a computing environment, said method comprising:
   dynamically switching for a fine grain sharing application from a locking based concurrency control technique to a non-locking based concurrency control technique used to access data of said computing environment, wherein said data is maintained on shared media accessible by a plurality of nodes of said computing environment; and
   using said non-locking based concurrency control technique to access said data.

26. The at least one program storage device of claim 25, wherein said fine grain sharing application includes requests from different nodes that frequently require conflicting access to a same data block.

27. The at least one program storage device of claim 25, wherein the locking based concurrency control technique comprises a distributed locking technique using read tokens/write tokens to synchronize access to said data.

28. The at least one program storage device of claim 25, wherein the non-locking based concurrency control technique comprises a static file partitioning technique.

29. The at least one program storage device of claim 25, wherein said method further comprises determining that a change to a different type of concurrency control technique is to occur.

30. The at least one program storage device of claim 29, wherein said determining comprises receiving an indication that said different type of concurrency control technique is to be used.

31. The at least one program storage device of claim 29, wherein said determining comprises employing statistics to determine if a change is to be made.

32. The at least one program storage device of claim 31, wherein said employing statistics comprises comparing a ratio of cache hits to token revokes to a predetermined threshold to determine if the change is to be made.

33. The at least one program storage device of claim 25, wherein said method further comprises switching back to said locking based concurrency control technique.

34. The at least one program storage device of claim 25, wherein said using comprises acquiring a lock for said data that indicates said locking based concurrency control technique is not being used.

35. The at least one program storage device of claim 25, wherein said method further comprises:

initiating a request to change to said non-locking based concurrency control technique, said initiating comprising providing a change request to a coordinator;

determining, by said coordinator, whether the change is to occur; and sending a change message from said coordinator to one or more nodes of said computing environment to effect said dynamically switching, when said change is to occur.

36. The at least one program storage device of claim 35, wherein said determining comprises at least one of:

receiving an explicit indication of said change; and using statistics to determine if the change is to be made.

37. A system of managing access to data of a computing environment, said system comprising:

a first node of said computing environment adapted to dynamically switch for a fine grain sharing application from a locking based concurrency control technique to a non-locking based concurrency control technique used to access data of said computing environment, wherein said data is maintained on shared media accessible by a plurality of nodes of said computing environment; and a second node of said computing environment adapted to use said non-locking based concurrency control technique to access said data.

38. The system of claim 37, wherein said first node and said second node are the same node.

39. The system of claim 37, wherein said first node and said second node are different nodes.

40. The method of claim 1, wherein the data is shared, but not replicated.

41. The system of claim 13, wherein the data is shared, but not replicated.

* * * * *

UNITED STATES PATENT AND TRADEMARK OFFICE
CERTIFICATE OF CORRECTION

PATENT NO. : 6,826,570 B1  
DATED : November 30, 2004  
INVENTOR(S) : Eshel et al.

It is certified that error appears in the above-identified patent and that said Letters Patent is hereby corrected as shown below:

<u>Title page,</u>  
Item [75], Inventors, after "James C. Wyllie", delete the words "Monte Screno" and insert -- Monte Sereno --

Signed and Sealed this

Fifteenth Day of February, 2005

JON W. DUDAS  
*Director of the United States Patent and Trademark Office*